April 28, 1964  W. J. LEITMANN  3,130,990
KNOB SPRING
Filed Sept. 11, 1961  2 Sheets-Sheet 1
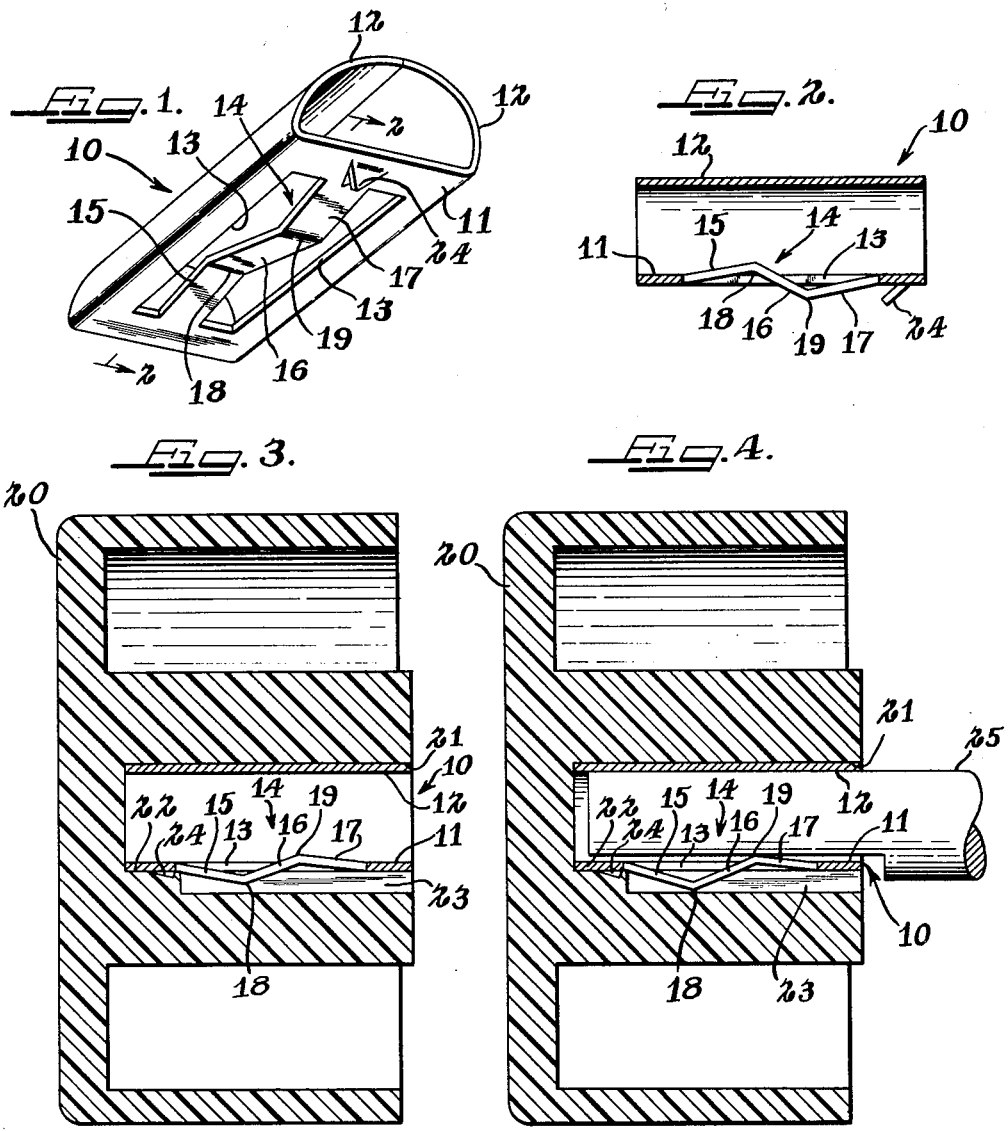
INVENTOR
WILLIAM J. LEITMANN
by Cromwell, Greist & Warden
Attys.

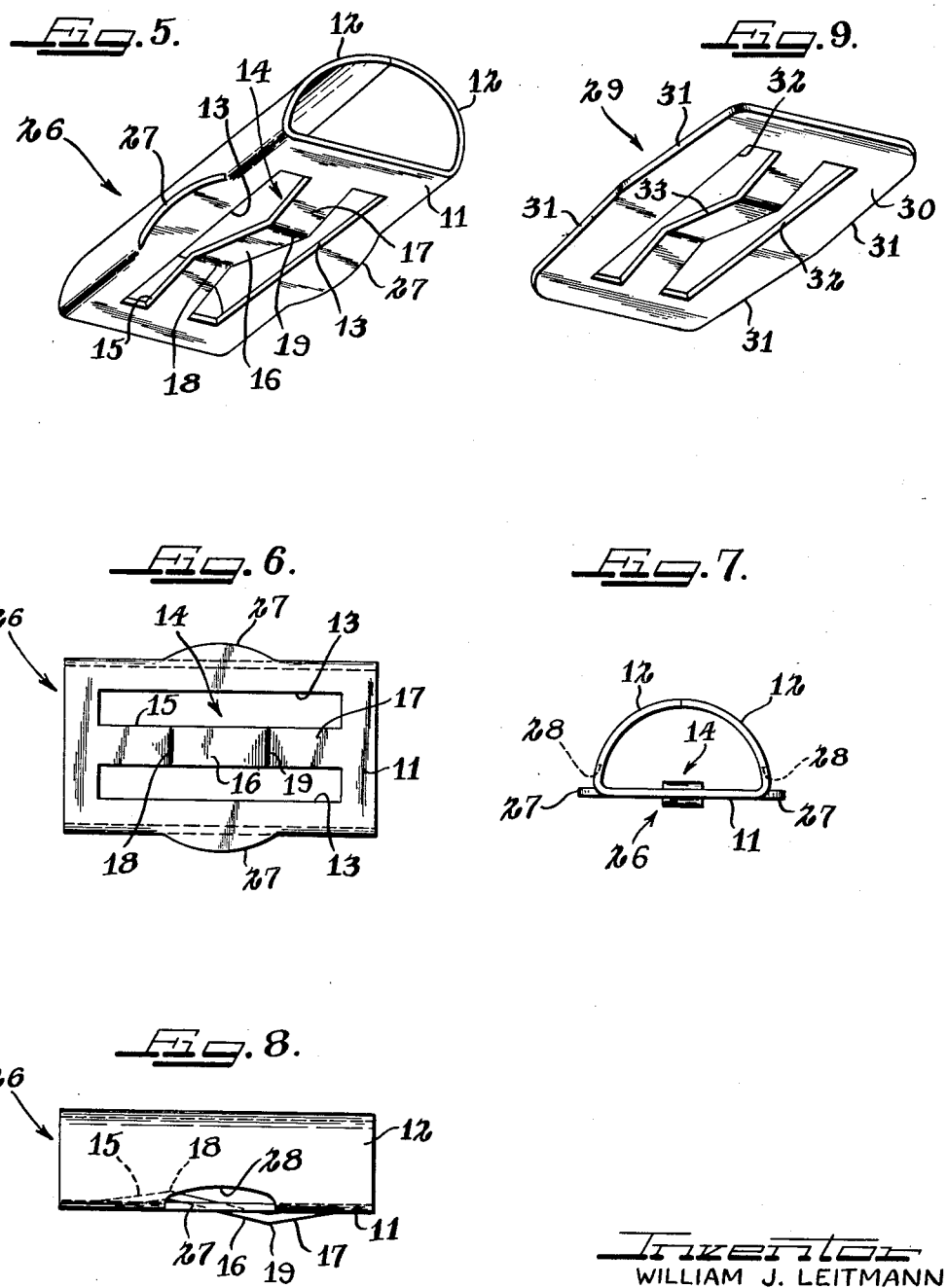

Un*i*ted States Patent Office 3,130,990
Patented Apr. 28, 1964

1

3,130,990
KNOB SPRING
William J. Leitmann, Chicago, Ill., assignor to Rohden
Manufacturing Company, Inc., Chicago, Ill., a corporation of Illinois
Filed Sept. 11, 1961, Ser. No. 137,173
2 Claims. (Cl. 287—53)

The invention is directed to a new and improved spring for use in mounting a member such as a control knob on a shaft-like means.

Many different forms of knob springs have been devised for use in mounting a control knob on a control shaft. Such springs generally include projecting resilient portions which frictionally engage the shaft or knob with the spring being fixedly mounted by some suitable means on the shaft or knob. One of the main considerations of spring design is that of the shape and functional properties of the projecting resilient leaf portion which provides the main function of the spring. Improvements in leaf portion design have been made but it has been found exceedingly difficult to balance out all of the several factors involved in efficient knob spring manufacture and utilization. By way of example, such springs are manufactured and sold in large quantities and to be profitable must be capable of low cost manufacture and installation. The springs are stamped from untempered metal plate and, in order to maintain the necessary economies in manufacture, the final configuration and location of the leaf portion should be established prior to heat treatment and be capable of being maintained during heat treatment for tempering purposes. These requirements establish a real problem with regard to many proposed leaf portion configurations. Additionally, the spring must be subject to ready installation in a knob and a leaf portion must provide the requisite frictional engagement with a control shaft to an extent permitting ready operative placement of the knob on the shaft while resisting inadvertent displacement of the knob from the shaft and yet permitting intended displacement without damage to the knob or mechanism of which the knob forms a part. Thus there are several critical factors which must be taken into consideration and adequately corelated or balanced relative to one another to arrive at a knob spring design capable of efficient manufacture and utilization.

It is an object of the invention to provide a new and improved spring for mounting in a knob or other suitable member for engagement with a shaft-like means received in the knob, the spring being capable of economical manufacture and efficient utilization.

A further object is to provide a new and improved knob spring having as a part thereof a new and improved spring leaf portion which is capable of efficient controlled shaping during manufacture of the spring and which provides the requisite shaft engaging function during use thereof.

Still a further object is to provide a new and improved knob spring having as a part thereof a uniquely designed spring leaf portion capable of efficient functioning in frictionally interconnecting a knob with a shaft, the invention extending to the assembly of a knob, shaft and improved spring and leaf portion thereof.

Other objects not specifically set forth will become apparent from the following detailed description of the invention made in conjunction with the accompanying drawings wherein:

2

FIG. 1 is a perspective of one form of improved knob spring of the invention, the spring being viewed from a point looking up toward the bottom surface thereof;

FIG. 2 is a longitudinal section of the spring of FIG. 1 as viewed generally along line 2—2 therein;

FIG. 3 is a vertical section of a knob having the spring of FIG. 1 operatively mounted therein;

FIG. 4 is a view similar to FIG. 3 illustrating operative functioning of the spring leaf portion of the spring upon insertion of a shaft in the knob;

FIG. 5 is a pespective similar to FIG. 1 illustrating another form of spring constituting a part of the present invention;

FIG. 6 is a bottom plan view of the spring of FIG. 5;

FIG. 7 is an end elevation of the spring of FIG. 5;

FIG. 8 is a side elevation of the spring of FIG. 5; and

FIG. 9 is a perspective of still another modified form of spring constituting a part of the invention.

The basic knob spring design of the invention involves the provision of a longitudinally extending, opposite end connected but otherwise freely acting spring leaf of generally spread Z-shape longitudinally thereof defining a raised area adjacent one end thereof for engagement with a shaft and a depending area adjacent the other end thereof. FIGS. 1 and 2 illustrate the improved spring 10 in semi-cylindrical form. In this form the spring is initially shaped from a flat piece of untempered metallic plate to include a relatively flat bottom mounting portion 11 having integrally joined therewith along opposite sides thereof upwardly and inwardly curving arcuate portions 12 which along their top free margins are arranged in closely positioned juxtaposed relation. The general configuration described conforms basically to the outline of a flat side control shaft which is well known.

The mounting portion 11 has formed therein a pair of transversely spaced and longitudinally extending cut-out areas 13 defining paralleling slots separated by a spring leaf 14 which constitutes an important part of the present invention. The spring leaf 14 is formed from a plurality of integral leg segments 15, 16 and 17. The segments 15 and 17 constitute end segments and are integrally formed with the mounting portion 11 for resilient flexing relative thereto. The segment 15 is inclined upwardly and rearwardly relative to the adjacent end of the mounting portion 11 with its uppermost extending portion being received within the interior of the spring 10 and raised above the inner or top surface of the mounting portion 11. The intermediate segment 16 is integrally formed with the upper end of the segment 15 and this area of juncture defined by the transverse crease 18 establishes a transverse flexible hinge portion. The segment 16 is inclined downwardly and away from the uppermost end of the segment 15 and extends diagonally through the mounting portion centrally of the slots 13. The lower end of the intermediate segment 16 is integrally joined with the lower end of the remaining end segment 17 in an area of juncture defined by the transverse crease 19. This juncture also defines a transverse flexible hinge portion permitting relative movement between the segments 16 and 17. The segment 17 from its area of juncture with the mounting portion 11 is inclined downwardly and rearwardly relative to the opposite end of the mounting portion 11 and at least generally parallels the segment 15. The leaf 14 thus generally provides a raised area of transverse flexible configuration specially established at the crease 18 and further provides a depending area of transverse flexible configuration specially defined by the crease 19. As illustrated, the segments 15, 16 and 17 are preferably of equal length.

FIGS. 3 and 4 illustrate a basic knob structure 20 having a central bore 21 in which the spring 10 is operatively mounted. The bore is of semi-cylindrical shape to provide for relatively snug mounting of the spring 10 therein, the flat bottom surface 22 of the bore 21 outwardly of the innermost portion thereof preferably being further cored out to define an area 23 of increased depth to accommodate operative flexing of the leaf 14 therein. To assist in spring retention in the bore 21 of the knob 20, the leading end portion of the mounting portion 11 may be provided with a depending and rearwardly inclined triangular barb 24 which is cut out from the material of the mounting portion 11 during formation of the spring. Other suitable means may be used to retain the spring 10 in the bore 21 if desired.

FIG. 3 illustrates the operative mounting of the spring 10 in the knob 20 prior to application of the knob on a shaft. In FIG. 3 the spring leaf 14 is illustrated in its relaxed condition with interconnected portions projecting upwardly into the bore 21 and projecting downwardly into the flexing area 23. FIG. 4 illustrates operative functioning of the spring leaf 14 in frictionally engaging the flat sided end of a shaft 25 being inserted in the bore 21 of the knob 20. The upwardly and inwardly inclined segment 15 readily accommodates the insertion of the shaft 25 with a leading edge of the shaft 25 engaging the top inclined surface of the segment 15 and readily sliding therealong with the result that the rim-like area is eventually depressed and the resilient force of the leaf is exerted against the flat side of the shaft 25 to frictionally engage the knob 20 thereon. During downward flexing of the leaf segment 15, the intermediate segment 16 moves downwardly and inwardly resulting in substantially corresponding downward deflection of the leaf segment 17. Thus the rim-like hinge area defined by the crease 19 moves downwardly into the flexing area 23.

With regard to the functioning of the spring leaf 14 described above, it will be appreciated that the leaf segments by reason of their arrangement an ddesign cooperate with one another to establish efficient frictional engagement with the shaft 25. The segments 15 and 17 may be considered cantilever portions which by reason of their interconnection through the intermediate segment 16 cooperate with one another in supplying the requisite controlled overall spring tension. In this respect the downward flexing of the segment 17 establishes a reaction force which is transmitted through the segment 16 to the deflected segment 15. In this manner the engaging force applied to the shaft 25 is supplied over a substantial spring area while maintaining the area of actual shaft contact at a minimum.

The spring leaf design and function provided thereby additionally provides for economical and efficient manufacture. The spring leaf shape may be readily imparted to the untempered metal as a result of a single stamping operation. The interconnected relationship of the spring leaf segments permit controlled heat treatment for tempering purposes without variation in final spring leaf configuration or segment position. In this respect the intermediate segment 16 is important in obtaining these results while additionally providing a continuity to the spring leaf which prevents subsequent tangling of a plurality of springs during storage thereof. For efficient utilization of the spring in the manner described, the spring leaf flexing area 23 should be of sufficient depth to prevent bottoming of the leaf.

FIGS. 5–8 illustrate a modified form of knob spring 26 which includes as a part thereof special spring retention means as a substitute for the barb 24 of the spring 10. In all other respects the spring 26 is the same design and configuration as the spring 10 and with regard to the common structural features, similar reference numerals are used to identify the same. The arcuate wall portions 12 of the spring 26 have removed therefrom a pair of outwardly projecting wedge-like shoulders 27 located along opposite side margins of the mounting portion 11. The shoulders 27 are of generally arcuate outline to provide for ready reception thereof in the bore 21 of the knob 20. These shoulders project outwardly to an extent to provide for tight frictional engagement with adjacent surface portion of the bore 21 to fix the spring 26 therein. FIG. 8 best illustrates the openings 28 formed in the arcuate portions 12 by removal of material therefrom constituting the shoulders 27. Here again, the spring 26 may be formed in a single stamping operation which includes the formation of the slots 13, shaping of the spring leaf 14 and forming of the shoulders 27.

Still another modification of knob spring 29 utilizing the special spring leaf configuration of the invention is illustrated in FIG. 9. This spring comprises a flat plate-like mounting portion 30 of generally rectangular outline being provided along opposite side margins with outwardly inclined edge portions 31 which impart to the spring wedge-shaped side margins for fixed positioning of the spring in the bore 21 of the knob 20. The mounting portion 30 has formed therein a pair of parallel slots 32 which receive therebetween a spring leaf 33 which is of the same configuration as the spring leaf 14 described above. In this respect the spring leaf 33 functions in exactly the same manner as the spring leaf 14. The spring 29 is illustrative of the basic versatility of use of the special spring leaf configuration of the present invention.

While the foregoing has dealt specifically with the use of the spring of the present invention in control knobs, it will be understood that the spring is adapted for other uses. For example, the spring 29 of FIG. 9 is also specially adapted for use in attaching and electrically interconnecting a lead terminal cap to a vacuum tube of known type. The spring being formed from metal permits ready lead attachment thereto and efficient current conduction while also performing the resilient attachment function. The width of the spring leaf provides for adequate current conducting engagement as well as providing a wiping action.

Obviously certain modifications and variations of the invention as hereinbefore set forth may be made without departing from the spirit and scope thereof, and therefore only such limitations should be imposed as are indicated in the appended claims.

I claim:

1. A spring for mounting in a knob for engagement with a shaft received in said knob, said spring comprising a flat mounting portion adapted to be received between opposed flattened surfaces of said knob and shaft, a spring leaf of longitudinal spread Z configuration forming a part of said mounting portion and attached at opposite ends thereto, said mounting portion being slotted to either side of said leaf to provide for free resilient movement of said leaf relative thereto, said leaf being composed of flat interconnected end segments and an intermediate segment, one of said end segments being inclined upwardly and rearwardly relative to one end of said mounting portion for engagement with said shaft, the other of said end segments being inclined downwardly and rearwardly relative to the opposite end of said mounting portion, said intermediate segment interconnecting the respective upper and lower ends of said end segments and extending diagonally through said mounting portion, said spring being semi-cylindrical and having cooperating arcuate portions joined with said mounting portion.

2. A spring for mounting in a knob for engagement with a shaft received in said knob, said spring comprising a flat mounting portion adapted to be received between opposed flattened surfaces of said knob and shaft, a spring leaf of longitudinal spread Z configuration forming a part of said mounting portion and attached at opposite ends thereto, said mounting portion being slotted to either side of said leaf to provide for free resilient movement of said leaf relative thereto, said leaf being composed of flat interconnected end segments and an intermediate segment, one of said end segments being inclined upwardly and rearwardly relative to one end of said mounting portion for engagement with said shaft, the other of said end segments being inclined downwardly and rearwardly relative to the opposite end of said mounting portion, said intermediate segment interconnecting the respective upper and lower ends of said end segments and extending diagonally through said mounting portion, and projecting wedge-like means along at least one side margin of said mounting portion.

References Cited in the file of this patent

UNITED STATES PATENTS

| | | |
|---|---|---|
| 1,240,940 | Carter | Sept. 25, 1917 |
| 2,149,746 | Pfeiffer | Mar. 7, 1939 |
| 2,225,086 | Schramm | Dec. 17, 1940 |
| 2,249,837 | Lee | July 22, 1941 |
| 2,249,872 | Turner | July 22, 1941 |
| 2,293,615 | Murphy | Aug. 18, 1942 |
| 2,733,083 | Strange | Jan. 21, 1956 |
| 2,745,689 | Balint et al. | May 15, 1956 |